(12) United States Patent
Lee

(10) Patent No.: US 11,259,512 B2
(45) Date of Patent: Mar. 1, 2022

(54) DUAL-DRIVING ONE-WAY ROTATIONAL DEVICE AND REEL INCLUDING SAME

(71) Applicant: Jin Su Lee, Incheon (KR)

(72) Inventor: Jin Su Lee, Incheon (KR)

( * ) Notice: Subject to any disclaimer, the term of this patent is extended or adjusted under 35 U.S.C. 154(b) by 0 days.

(21) Appl. No.: 17/255,543

(22) PCT Filed: Sep. 6, 2019

(86) PCT No.: PCT/KR2019/011583
§ 371 (c)(1),
(2) Date: Dec. 23, 2020

(87) PCT Pub. No.: WO2020/055049
PCT Pub. Date: Mar. 19, 2020

(65) Prior Publication Data
US 2021/0251206 A1     Aug. 19, 2021

(30) Foreign Application Priority Data

Sep. 14, 2018  (KR) .................. 10-2018-0110309
Oct. 25, 2018  (KR) .................. 10-2018-0128450

(51) Int. Cl.
*A01K 89/01*  (2006.01)
*A01K 89/012*  (2006.01)
*A01K 89/00*  (2006.01)

(52) U.S. Cl.
CPC .......... *A01K 89/012* (2013.01); *A01K 89/006* (2013.01)

(58) Field of Classification Search
CPC .. A01K 89/012; A01K 89/006; A01K 89/017; A01K 89/0173; A01K 89/0186
See application file for complete search history.

(56) References Cited

U.S. PATENT DOCUMENTS

| | | | | |
|---|---|---|---|---|
| 3,126,166 A | * | 3/1964 | Weinberg ............. | A01K 89/006 242/250 |
| 4,021,003 A | * | 5/1977 | Watkins ............... | A01K 89/017 242/250 |
| 4,283,025 A | * | 8/1981 | Whisenhunt .......... | G05G 1/085 242/250 |

(Continued)

FOREIGN PATENT DOCUMENTS

| JP | 2004-000099 A | 1/2004 |
|---|---|---|
| JP | 2006-115805 A | 5/2006 |

(Continued)

*Primary Examiner* — Emmanuel M Marcelo
(74) *Attorney, Agent, or Firm* — KORUS Patent, LLC; Seong Il Jeong

(57) ABSTRACT

A dual-driving one-way rotational device includes: a body part; a clutch bearing part configured to guide the rotation of the body part in one direction; a knob part configured to be rotated in one direction in the state of being connected to an object to be rotated or to prevent the body part from being rotated together when the object to be rotated and the clutch bearing part are rotated in the same direction; a manual rotation lever installed on the body part; and a power transmission shaft coupled to the knob part, and configured to transfer the power of a power source. The knob part includes a rotation portion and a head portion. A spiral is formed on the inner circumferences of the rotation portion and the head portion. The power transmission shaft has the outer circumference on which a spiral is formed.

3 Claims, 8 Drawing Sheets

(56) References Cited

U.S. PATENT DOCUMENTS

| | | | | |
|---|---|---|---|---|
| 5,056,732 | A * | 10/1991 | Nicholson, Jr. | B65H 54/106 242/470 |
| 6,685,125 | B1 * | 2/2004 | Tucci | A01K 97/01 242/390.8 |
| 6,902,525 | B1 * | 6/2005 | Jewell | A61H 19/44 600/38 |
| 7,086,622 | B1 * | 8/2006 | Whaley | A01K 89/017 242/323 |
| 7,309,039 | B1 * | 12/2007 | Stone | A01K 89/017 242/225 |
| 7,748,657 | B1 * | 7/2010 | Goodman | A01K 89/003 242/323 |
| 7,793,877 | B2 * | 9/2010 | Ogino | A01K 89/017 242/250 |
| 7,909,280 | B1 * | 3/2011 | Herrick | A01K 89/017 242/323 |
| 9,179,657 | B1 * | 11/2015 | Winter | A01K 87/00 |
| 9,532,557 | B2 * | 1/2017 | Kennedy | A01K 89/006 |
| 9,918,457 | B2 * | 3/2018 | Masten | B65H 54/44 |
| 10,772,312 | B1 * | 9/2020 | Norton | A01K 89/00 |
| 2003/0168546 | A1 * | 9/2003 | Bankston | B65H 54/00 242/390.8 |
| 2015/0033611 | A1 * | 2/2015 | Hamilton, II | A01K 85/00 43/17 |

FOREIGN PATENT DOCUMENTS

| | | |
|---|---|---|
| JP | 2018-019688 A | 2/2018 |
| KR | 10-2012-0086889 A | 8/2012 |

\* cited by examiner

DUAL-DRIVING ONE-WAY ROTATIONAL DEVICE AND REEL INCLUDING SAME

TECHNICAL FIELD

The present invention relates to a dual-driving one-way rotational device that can rotate inner and outer objects to be rotated simultaneously in the same direction or rotate only an inner object to be rotated and can freely and selectively rotate the one or more objects to be rotated by a manual method or an electric method, and also relates to a reel including the same.

BACKGROUND ART

Fishing reels may be classified into manual reels configured to allow a fishing line to be wound as a user rotates a manual operation lever coupled to the shaft of a spool and electric reels configured to allow a fishing line to be wound as a spool is rotated by the driving of a drive motor installed inside a reel body.

Furthermore, in general, manual reels are used on coasts where the depth thereof is not deep. When users do fishing on ships targeting fish species living in the deep water, electric reels are generally used.

Therefore, for those who enjoy both coastal fishing and onboard fishing, both manual and electric reels must be provided. In this case, a problem arises in that large reel purchase expenses are incurred. When manual reels are used in the deep water, users experience less fatigue when submerging a fishing hook in the deep water but suffer from significant physical fatigue and may inadvertently injure themselves when raising it in the fishing genre where users frequently unwind and rewind a fishing line.

Electric reels are a way to overcome these problems. Although electric reels have various functions such as a depth check function and a shipboard function, it is not an exaggeration to say that the main function thereof is the rotation function of winding up an object in the deep water.

They utilize the power of a motor to reduce physical power, but this also has absurdity.

Manual reels have all requirements for their functions, and are intended to obtain that power through physical strength. In order to obtain the power using a motor, the motor must also be inserted into the manual reel, and various combinations including gear devices must be combined in a single body to rotate the motor.

Accordingly, a manual reel's own weight becomes heavier, and thus another physical fatigue is felt to lift it by hand. Furthermore, since many parts are included for this assembly, the price of products must be set considerably high, so that the burden is bound to come to consumers.

Additionally, in general, a manual reel and an electric reel may be selectively replaced and used, but this incurs a problem of inconvenience in that a user must directly replace it according to the fishing location.

DISCLOSURE

Technical Problem

The present invention has been conceived to overcome the above-described problems of the prior art, and an object of the present invention is to provide a dual-driving one-way rotational device that can rotate inner and outer objects to be rotated simultaneously in the same direction or rotate only an inner object to be rotated and can freely and selectively rotate the one or more objects to be rotated by a manual method or an electric method.

Furthermore, an object of the present invention is to provide a reel that includes a dual-driving one-way rotational device and, thus, can manually and electrically wind a fishing line around a spool.

Technical Solution

According to the present invention, there is provided a dual-driving one-way rotational device including: a body part; a clutch bearing part installed inside the body part, and configured to guide the rotation of the body part in one direction; a knob part mounted in the clutch bearing part, and configured to be rotated in one direction in the state of being connected to an object to be rotated or to prevent the body part from being rotated together when the object to be rotated and the clutch bearing part are rotated in the same direction; a manual rotation lever installed on the body part; and a power transmission shaft coupled to the knob part, and configured to transfer the power of a power source;

wherein the knob part includes a rotation portion mounted and rotated in the clutch bearing part; and a head portion integrated with one end of the rotation portion, and configured to have a wider periphery than the rotation portion;

wherein a spiral configured to be engaged with the rotating shaft of the object to be rotated is formed on the inner circumferences of the rotation portion and the head portion; and wherein the power transmission shaft has the outer circumference on which a spiral is formed, and is engaged with the spiral of the knob part together with a rotating shaft of the object to be rotated.

According to the present invention, there is provided a reel including a reel frame, a reel body installed in the reel frame to be rotated in place and adapted to include a spool configured such that a fishing line is wound around and outer surface thereof, and the dual-driving one-way rotational device configured to rotate a reel rotating shaft provided in the spool in one direction.

The reel further includes an electric power supply unit configured to supply power to the power transmission shaft so that the rotating shaft and the knob part are rotated collectively, and the electric power supply unit includes:

a casing; a motor installed in the casing, and fixed in such a manner that a motor shaft protrudes out of the motor and is fixed to the power transmission shaft; and a switch provided on the casing to selectively turn the motor on and off.

Advantageous Effects

The dual-driving one-way rotational device according to the present invention can rotate inner and outer objects to be rotated simultaneously in the same direction or rotate only an inner object to be rotated, thereby providing the effect of being utilized in various fields. The dual-driving one-way rotational device can freely and selectively rotate the one or more objects to be rotated by a manual method or an electric method, thereby providing the effect of improving ease of use.

Furthermore, the reel including the dual-driving one-way rotational device can manually and electrically wind a fishing line around a spool. When a user does fishing using a short or long throw method on the shore having a low depth, a fishing line can be manually wound. When a user does fishing on board for fishes living in deep water, a fishing line can be electrically wound. Accordingly, an effect arises in that ease of use is improved.

BEST MODE

Figure 1:
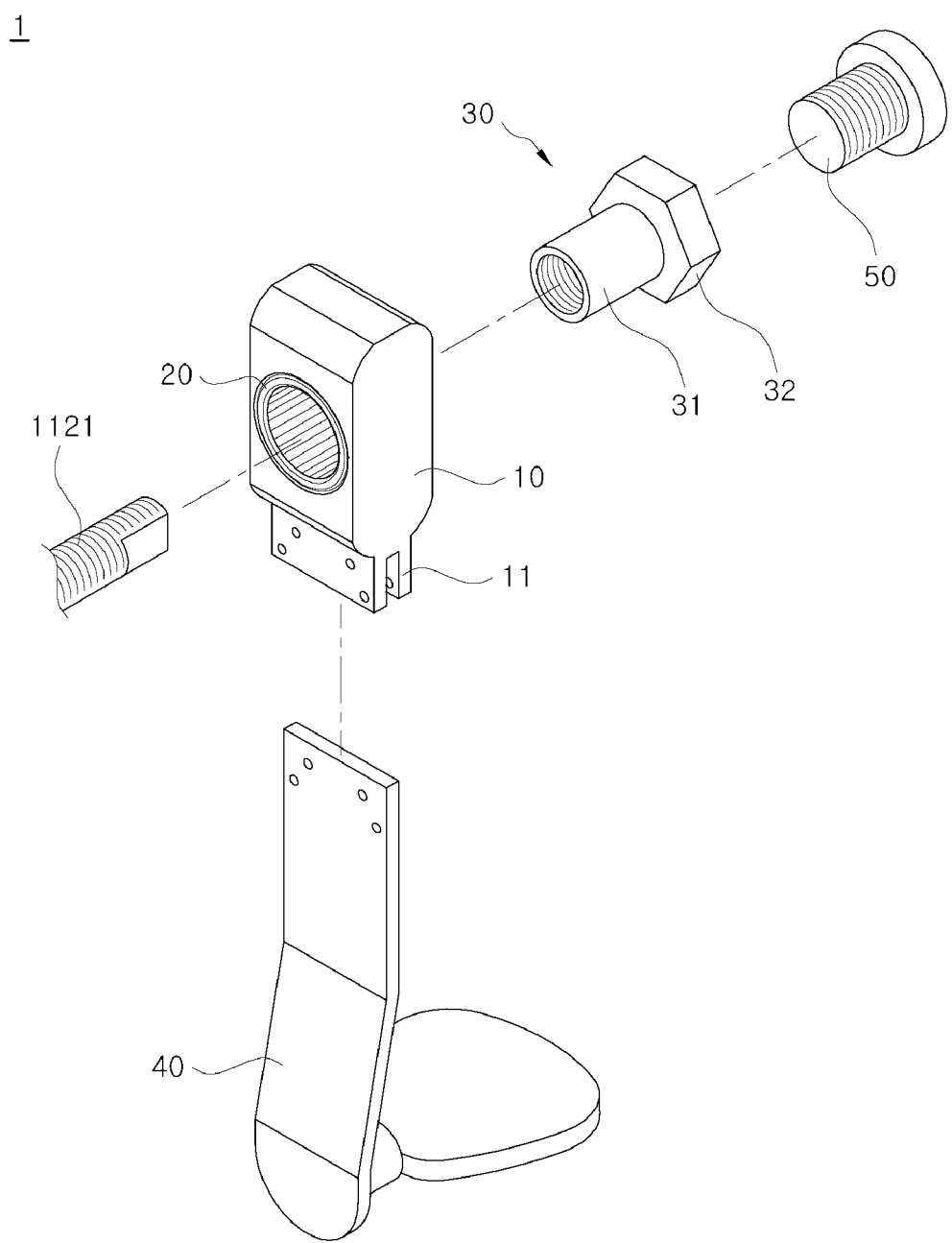
FIG. 1 is an exploded perspective view showing a dual-driving one-way rotational device according to the present invention.

According to the present invention, there is provided a dual-driving one-way rotational device including: a body part; a clutch bearing part installed inside the body part, and configured to guide the rotation of the body part in one direction; a knob part mounted in the clutch bearing part, and configured to be rotated in one direction in the state of being connected to an object to be rotated or to prevent the body part from being rotated together when the object to be rotated and the clutch bearing part are rotated in the same direction; a manual rotation lever installed on the body part; and a power transmission shaft coupled to the knob part, and configured to transfer the power of a power source;

wherein the knob part includes a rotation portion mounted and rotated in the clutch bearing part; and a head portion integrated with one end of the rotation portion, and configured to have a wider periphery than the rotation portion;

wherein a spiral configured to be engaged with the rotating shaft of the object to be rotated is formed on the inner circumferences of the rotation portion and the head portion; and wherein the power transmission shaft has the outer circumference on which a spiral is formed, and is engaged with the spiral of the knob part together with a rotating shaft of the object to be rotated.

According to the present invention, there is provided a reel including a reel frame, a reel body installed in the reel frame to be rotated in place and adapted to include a spool configured such that a fishing line is wound around and outer surface thereof, and the dual-driving one-way rotational device configured to rotate a reel rotating shaft provided in the spool in one direction.

MODE FOR INVENTION

The advantages and features of the present invention and a method of achieving them will become apparent by referring to the embodiments described below in detail in conjunction with the accompanying drawings.

However, the present invention is not limited to the embodiments disclosed below, but may be implemented in various different forms. These embodiments are provided merely to complete the disclosure of the present invention and to fully inform the scope of the invention to those of ordinary skill in the art to which the present invention pertains. The invention is only defined by the scope of the claims. The same reference numerals refer to the same components throughout the specification.

Embodiments of the present invention will be described in detail with reference to the accompanying drawings so that those of ordinary skill in the art to which the present invention pertains can easily implement the present invention. However, the present invention may be implemented in various different forms and is not limited to the embodiments described herein. The same reference numerals are assigned to similar parts throughout the specification.

Figure 2:
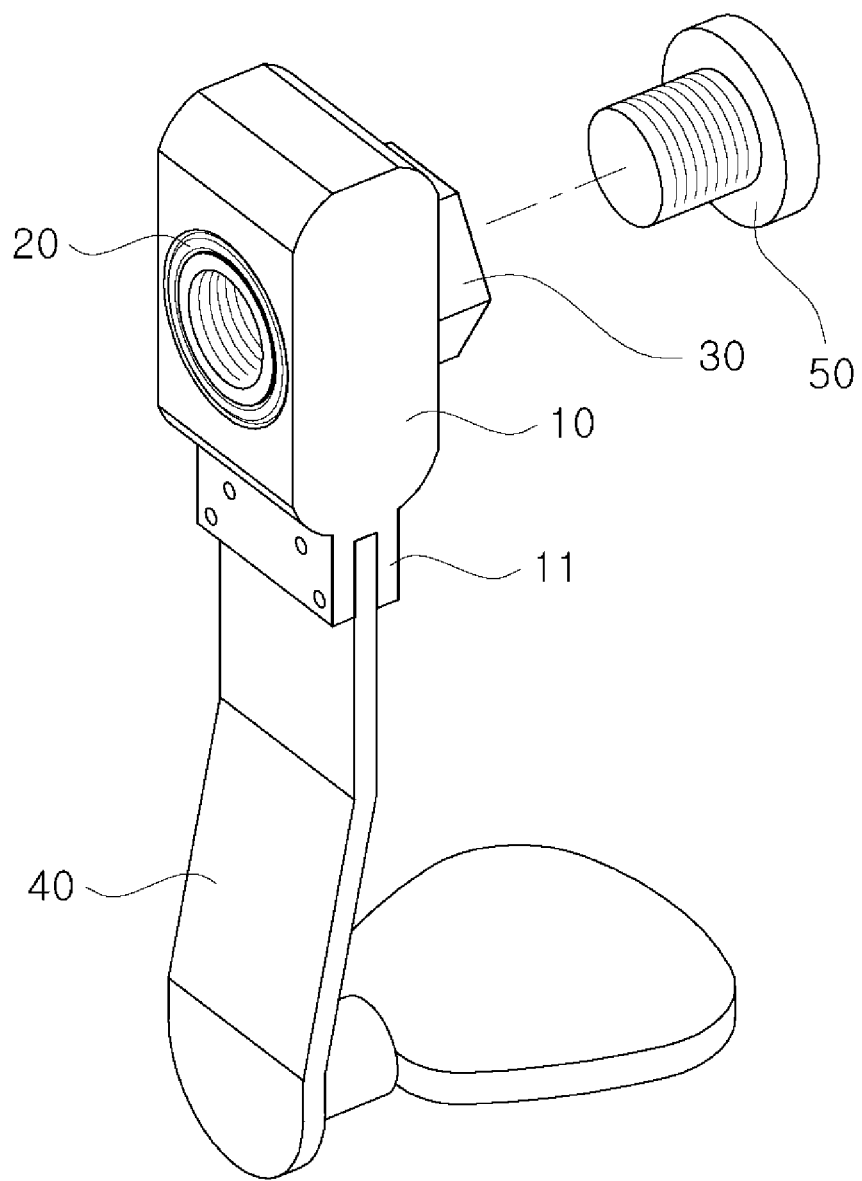
FIG. 2 is a combined perspective view showing the dual-driving one-way rotational device according to the present invention.
Figure 3:
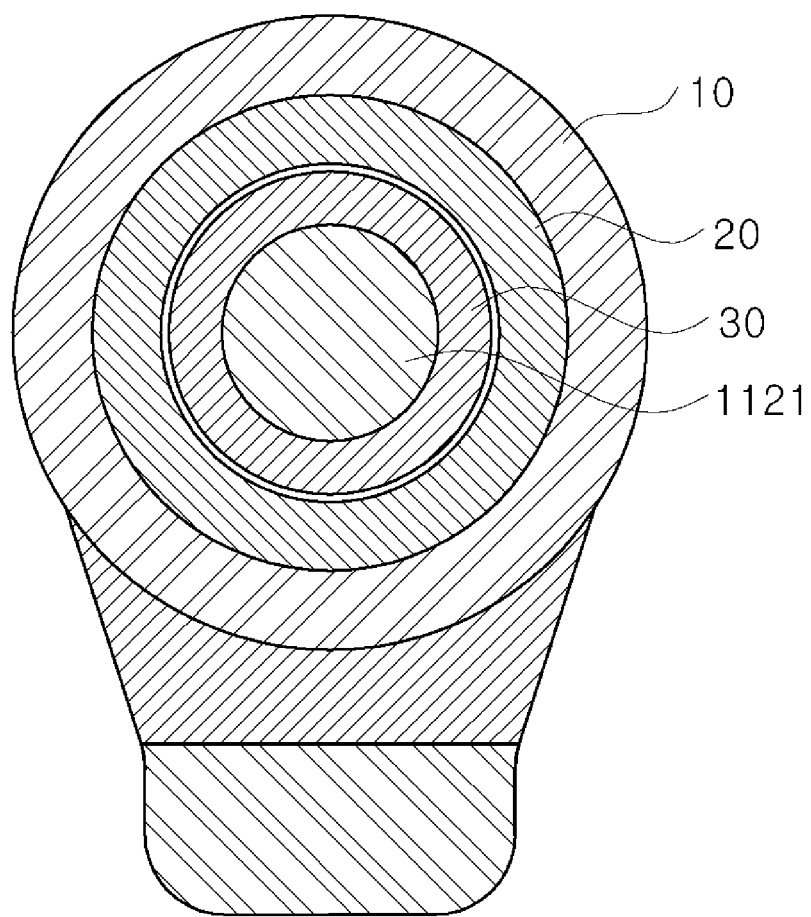
FIGS. 3 and 4 are combined sectional views showing the dual-driving one-way rotational device according to the present invention.
Figure 4:
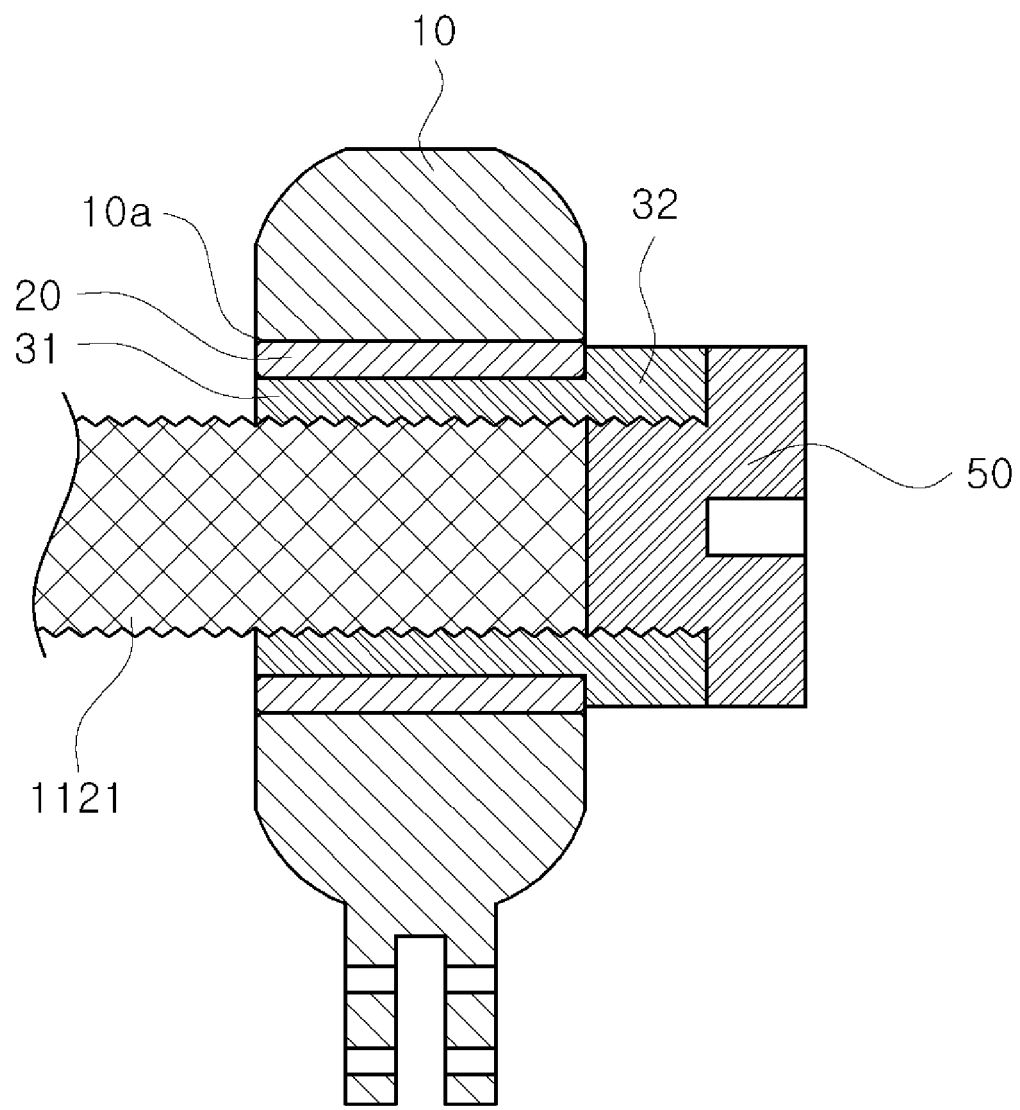
Figure 5:
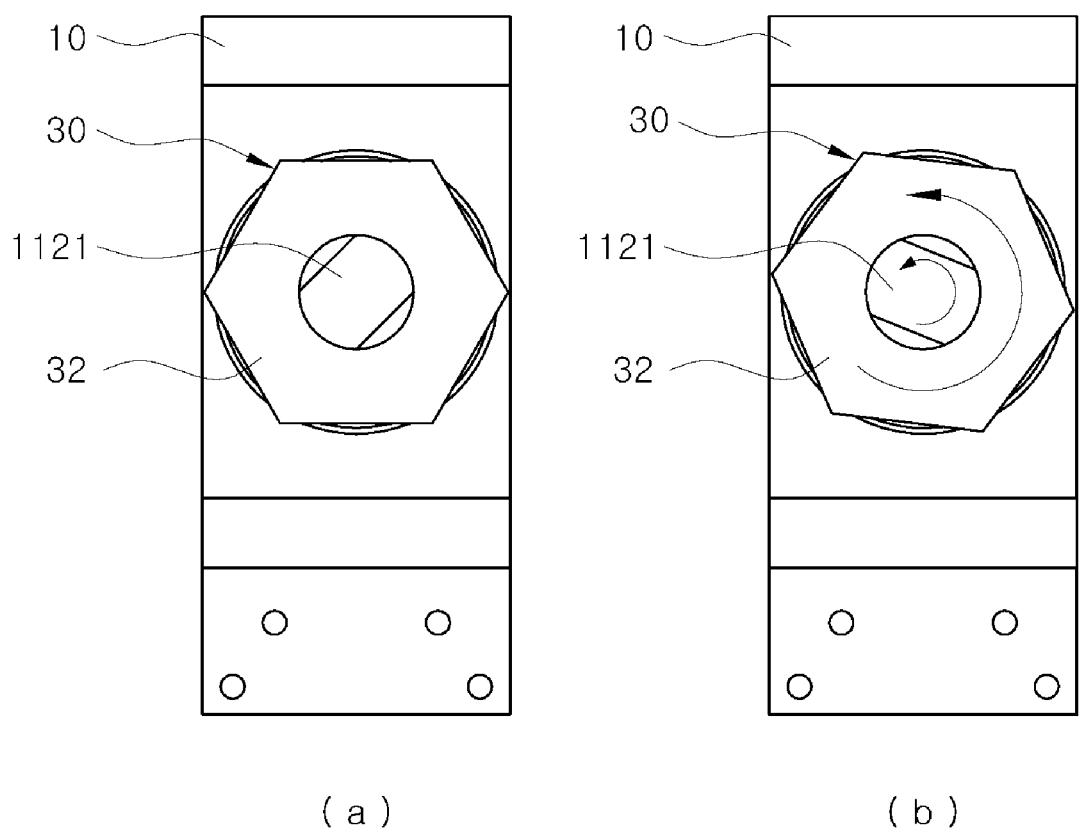
FIG. 5 is a front view showing a state in which a knob and a rotating shaft applied to the dual-driving one-way rotational device according to the present invention are rotated in conjunction with each other.
Figure 6:
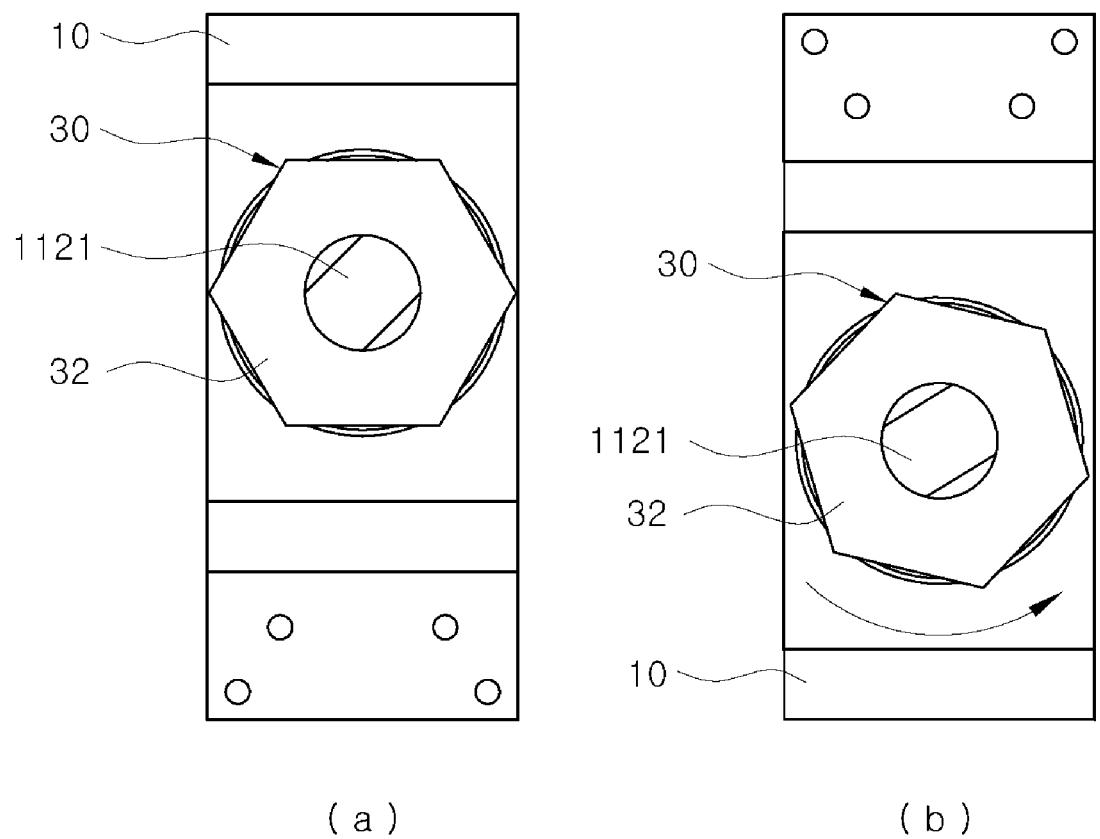
FIG. 6 is a front view showing a state in which a body part applied to the dual-driving one-way rotational device according to the present invention is rotated.

FIG. 1 is an exploded perspective view showing a dual-driving one-way rotational device according to the present invention, FIG. 2 is a combined perspective view showing the dual-driving one-way rotational device according to the present invention, FIGS. 3 and 4 are combined sectional views showing the dual-driving one-way rotational device according to the present invention, FIG. 5 is a front view showing a state in which a knob and a rotating shaft applied to the dual-driving one-way rotational device according to the present invention are rotated in conjunction with each other, and FIG. 6 is a front view showing a state in which a body part applied to the dual-driving one-way rotational device according to the present invention is rotated.

The dual-driving one-way rotational device 1 according to the present invention is a product that may rotate two objects to be rotated simultaneously in the same direction or rotate only an inner object to be rotated and may freely and selectively rotate an object to be rotated by a manual method or an electric method.

To this end, the dual-driving one-way rotational device 1 according to the present invention may include a body part 10, a clutch bearing part 20, and a knob part 30.

In this case, the object to be rotated may be various things, such as a fishing reel, a device for winding a general hose or a fire hose, and other devices requiring rotational force. An example in which a reel is applied as the object to be rotated will be described below.

The body part 10 functions to enable the dual-driving one-way rotational device 1 according to the present invention to be connected to the object to be rotated, and also functions to enable the clutch bearing part 20 and the knob part 30 to be installed and rotated.

Accordingly, the body part 10 may be made of a metal material or stainless steel material that is not easily damaged or rusted during use.

Based on FIG. 4, a mounting hole 10a in which the clutch bearing part 20 is mounted is formed in the approximately central portion of the body part 10 in a horizontal direction.

It is obvious that the main body portion 10 is provided with a holding means such as a stepped or pressing protrusion for preventing the clutch bearing part 20 from being separated to the outside.

A pair of coupling plates 11 to which a manual rotation lever 40 to be described later is coupled is formed on the bottom of the main body 10 in an integrated manner.

The coupling plates 11 may be each formed in various shapes such as a polygonal shape or a curved shape, and may be made of the same material as the body part 10.

The clutch bearing part 20 is mounted in the mounting hole 10a of the body part 10, and enables the rotation of the knob part 30 to be described later in only one direction while enabling the rotation of the body part 10 in only one direction.

The knob part 30 may include a rotation portion 31 formed in a cylindrical shape having the same outer diameter as a whole, and a polygonal head portion 32 integrated with one end of the rotation portion 31 as a hollow member and configured to have a wider circumference than the rotation portion 31.

Furthermore, a spiral which is connected to each other and with which the rotating shaft 1121 of the object to be rotated is engaged is formed along the inner circumferences of the rotating portion 31 and the head portion 32 in an integrated manner.

In other words, as shown in FIG. 5, the rotation portion 31 is rotated together with the rotation shaft 1121 in the left direction in the state of being mounted in the clutch bearing part 20 but is not rotated in the right direction. The head portion 32 is rotated in the same direction as the rotation portion 31 in the state of being in contact with the outer surface of the body part 10.

On the other hand, the body part 10 may be rotated only in the same direction as the knob part 30 using the rotation portion 31 fastened to the rotating shaft 1121 as an axis.

In other words, based on FIG. 6, the clutch bearing part 20 allows the rotation of the knob part 30 only in the left direction. When the manual rotation lever 40 coupled between the coupling plates 11 is rotated in the left direction, the body part 10, the rotation shaft 1121, the clutch bearing part 20, and the knob part 30 are also rotated in the left direction.

Additionally, when the body part 10 is rotated in the right direction, the rotating shaft 1121, the clutch bearing part 20, and the knob part 30 are not rotated, and only the body part 10 is idly rotated using the rotation portion 31 as an axis.

In addition, the rotating shaft 1121 and the knob part 30 may be automatically rotated through the above-described structural feature according to the present invention.

To this end, the dual-driving one-way rotational device 1 according to the present invention may further include a power transmission shaft 50 configured to transmit the power of a power source.

The power transmission shaft 50 has a spiral formed on the outer circumference thereof, and is engaged with the spiral of the knob part 30.

In other words, the rotating shaft 1121 and the power transmission shaft 50 are simultaneously fastened to the inside of the knob part 30.

Furthermore, a portion of the power transmission shaft 50 protrudes out of the knob part 30, and a substantially polygonal groove is formed in the protruding portion.

Accordingly, when a power source such as a motor is connected and driven, the power transmission shaft 50, the knob part 30, and the rotating shaft 1121 may be rotated automatically and collectively.

Next, a reel including the dual-driving one-way rotational device will be described.

Figure 7:
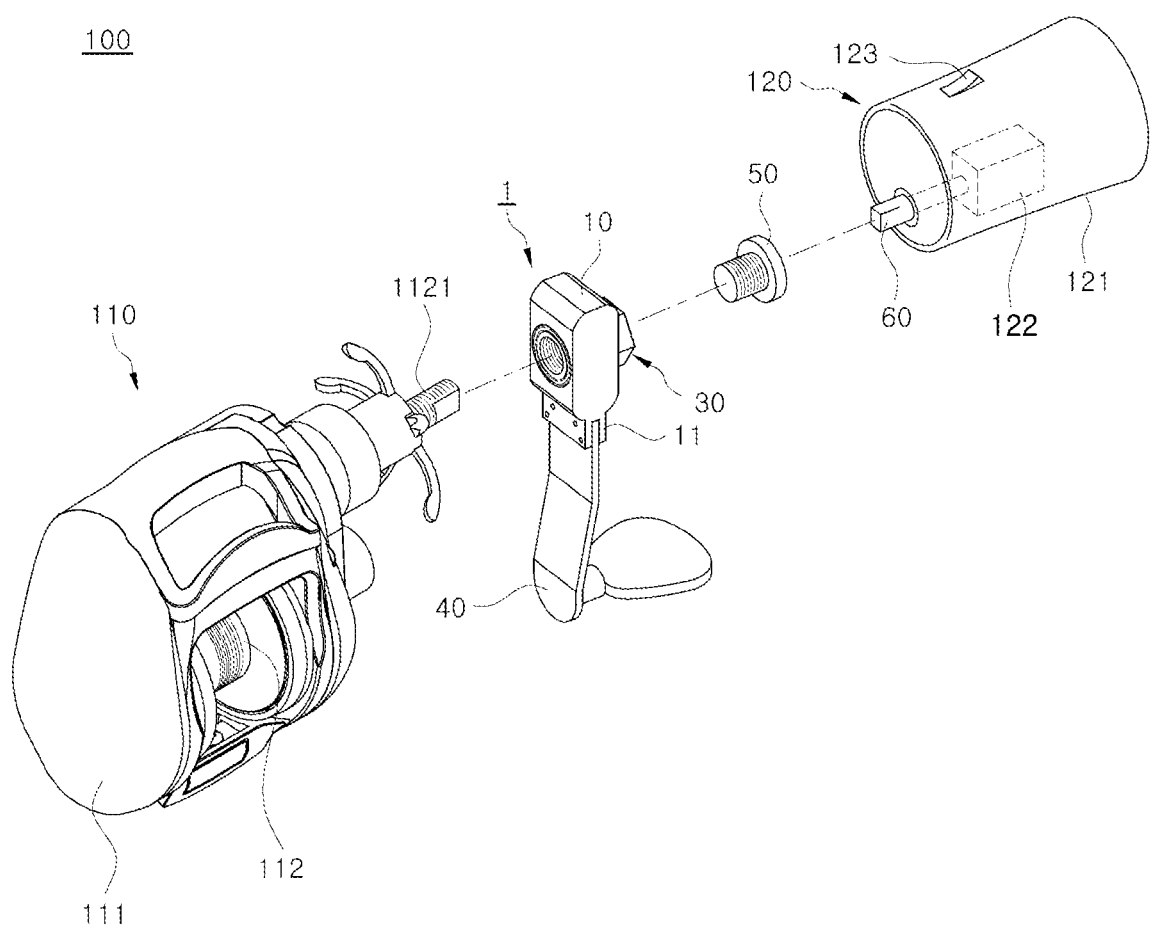
FIG. 7 is an exploded perspective view showing a reel including the dual-driving one-way rotational device according to the present invention.
Figure 8:
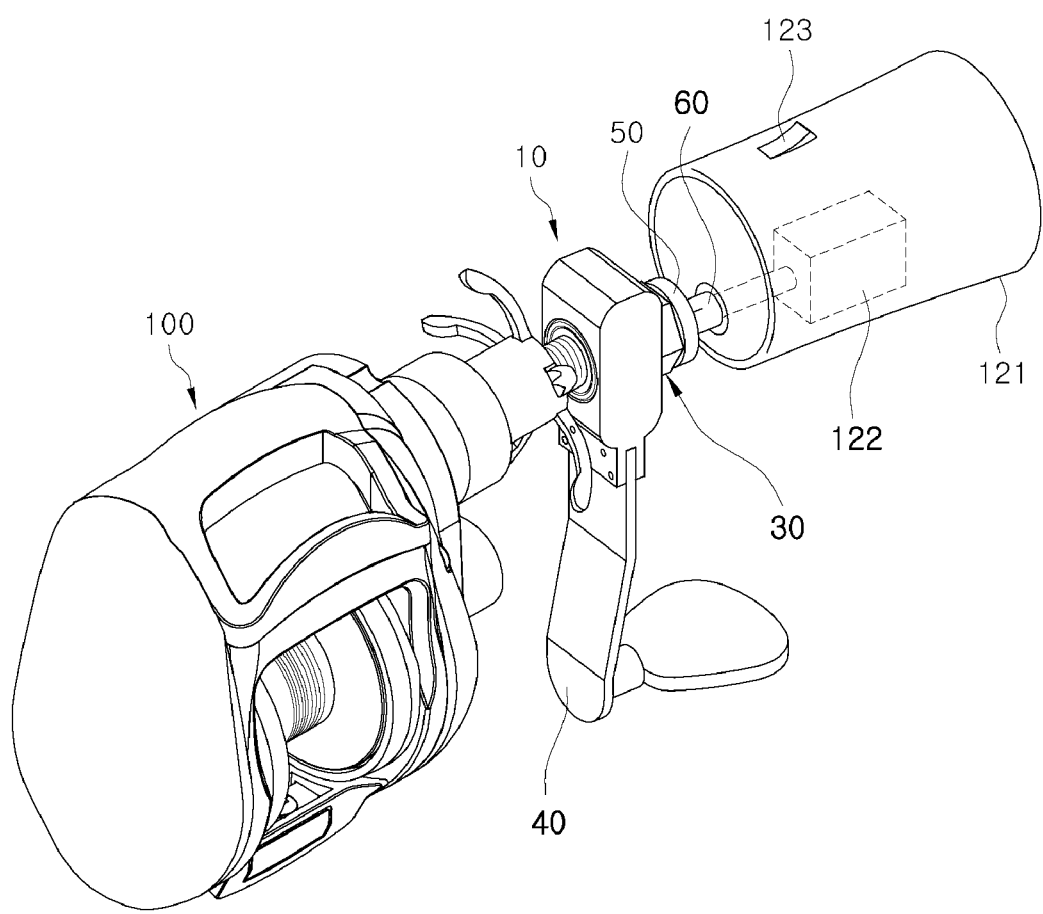
FIG. 8 is a combined perspective view showing the dual-driving one-way rotational device according to the present invention.

FIG. 7 is an exploded perspective view showing a reel including the dual-driving one-way rotational device according to the present invention, and FIG. 8 is a combined perspective view showing the dual-driving one-way rotational device according to the present invention.

The reel 100 according to the present invention includes: a reel body 110 including a reel frame 111 and a spool 112 installed in the reel frame 111 to be rotatable in place and configured such that a fishing line is wound around the outer surface thereof; the dual-driving one-way rotational device 1 configured to rotate the rotation shaft 1121 provided on the spool 112 in one direction; and an electric power transmission part 120 configured to rotate the rotating shaft 1121 so that the fishing line is wound around the spool 112.

Since the overall external configuration of the reel body 110 is commercially available, a detailed description thereof will be omitted, and the electric power transmission part 120 will be described in detail below.

The electric power transmission part 120 supplies power to the power transmission shaft 50 so that the rotating shaft 1121 and the knob part 30 are rotated collectively, and may include a casing 121, a motor 122, and a switch 123 configured to selectively turn the motor 122 on and off.

The casing 121 may be formed in a size that can be easily gripped by a user with one hand during fishing.

A rubber or silicone pad may be installed on the outer surface of the casing 121 to prevent slipping when the casing 121 is gripped.

A rechargeable battery (not shown) configured to supply power to the motor 122 and a charging unit (not shown) configured to charge the battery may be installed in the inner space of the casing 121, and the charging unit has a USB connection terminal to receive external power.

The motor 122 may be installed in the inner space of the casing 121, and a known AC motor or DC motor in which the shaft of the motor 122 is rotated in only one direction may be applied.

In this case, the motor shaft protrudes out of the casing 121 to be connected to the power transmission shaft 50.

Furthermore, a coupler 60 configured to be inserted into the groove of the power transmission shaft 50 may be mounted on the outer surface of the motor shaft.

In this case, the coupler 60 is formed in a polygonal shape so that it can rotate the power transmission shaft 50 when the motor shaft is rotated.

Next, the operation and unique effects of the reel according to the present invention including the above-described configuration will be described.

First, when a user fishes in a low-depth place, a weight and a fishing hook may be connected to a neckline, a bait suitable for a target fish species such as a live bait, e.g., earthworm, loach, or squid cut to a predetermined size, or an artificial bait may be selected and put on the fishing hook, and the fishing hook may be settled in the water by throwing it at a short or long distance Furthermore, when a fish bites a fishing hook or when a predetermined time has passed after a bait is thrown and the bait put on the fishing hook is to be replaced with a new one, the manual rotation lever 40 may be repeatedly rotated, and thus a fishing line settled in water may be wound around the spool 112.

In other words, when the manual rotation lever 40 is rotated, the body part 10, the clutch bearing part 20, the knob part 30, the rotating shaft 1121, and the spool 112 are rotated collectively, and thus the fishing line is wound around the spool 112, so that the weight and fishing hook thrown into the water can be recovered.

In contrast, when a user does fishing on board targeting fishes living in deep waters of about 50 to 100 m, a weight and a fishing hook may be connected to a neckline, a bait suitable for a target fish species such as a live bait, e.g., earthworm, loach, or squid cut to a predetermined size, or an artificial bait may be selected and put on the fishing hook, and the fishing hook may be settled in the water by unwinding a fishing line from a spool and lowering the fishing hook vertically.

Thereafter, when a fish bites a fishing hook or when a predetermined time has passed after a bait is thrown and the bait put on the fishing hook is to be replaced with a new one, the coupler 60 mounted on the motor shaft may be fixed to the power transmission shaft 50, and the switch 123 provided on the casing 121 may be pressed such that the fishing line settled in the water is wound around the spool 112.

In this case, when the motor shaft is rotated, the power transmission shaft 50 is rotated, so that the rotation portion 31 is rotated in place in the clutch bearing part 20 and the rotating shaft 1121 and the spool 112 fastened to the rotation portion 31 are simultaneously rotated. As a result, the fishing line is wound around the spool 112, and thus the weight and the fishing needle thrown into the water may be easily recovered.

It will be understood by those of ordinary skill in the art to which the present invention pertains that the present invention may be implemented in other specific forms without changing the technical spirit or essential features thereof. Therefore, it should be understood that the embodiments described above are illustrative and non-limiting in all respects.

The scope of the present invention is defined by the scope of the claims to be described later rather than the detailed description, and it should be appreciated that all changes or modified forms derived from the meaning and scope of the claims and the concept of equivalents thereof are included in the scope of the present invention.

INDUSTRIAL APPLICABILITY

The dual-driving one-way rotational device according to the present invention can rotate inner and outer objects to be rotated simultaneously in the same direction or rotate only an inner object to be rotated, thereby providing the effect of being utilized in various fields. The dual-driving one-way rotational device can freely and selectively rotate the one or more objects to be rotated by a manual method or an electric method, thereby providing the effect of improving ease of use.

Furthermore, the reel including the dual-driving one-way rotational device can manually and electrically wind a fishing line around a spool. When a user does fishing using a short or long throw method on the shore having a low depth, a fishing line can be manually wound. When a user does fishing on board for fishes living in deep water, a fishing line can be electrically wound. Accordingly, an effect arises in that ease of use is improved. Therefore, the present invention has industrial applicability.

The invention claimed is:

1. A dual-driving one-way rotational device comprising:
    a body part;
    a clutch bearing part installed inside the body part, and configured to guide rotation of the body part in one direction;
    a knob part mounted in the clutch bearing part, and configured to be rotated in one direction in a state of being connected to an object to be rotated or to prevent the body part from being rotated together when the object to be rotated and the clutch bearing part are rotated in a same direction;
    a manual rotation lever installed on the body part; and
    a power transmission shaft coupled to the knob part, and configured to transfer power of a power source;
    wherein the knob part comprises:
        a rotation portion mounted and rotated in the clutch bearing part; and
        a head portion integrated with one end of the rotation portion, and configured to have a wider periphery than the rotation portion;
    wherein a spiral configured to be engaged with a rotating shaft of the object to be rotated is formed on inner circumferences of the rotation portion and the head portion; and
    wherein the power transmission shaft has an outer circumference on which a spiral is formed, and is engaged with the spiral of the knob part together with a rotating shaft of the object to be rotated.

2. A reel comprising a reel frame, a reel body installed in the reel frame to be rotated in place and adapted to include a spool configured such that a fishing line is wound around and outer surface thereof, and the dual-driving one-way rotational device of claim 1 configured to rotate the reel rotating shaft provided in the spool in one direction.

3. The reel of claim 2, further comprising an electric power supply unit configured to supply power to the power transmission shaft so that the rotating shaft and the knob part are rotated collectively;
    wherein the electric power supply unit comprises:
        a casing;
        a motor installed in the casing, and fixed in such a manner that a motor shaft protrudes out of the motor and is fixed to the power transmission shaft; and
        a switch provided on the casing to selectively turn the motor on and off.

* * * * *